United States Patent [19]

Inaba et al.

[11] Patent Number: 4,592,703
[45] Date of Patent: Jun. 3, 1986

[54] SCROLL COMPRESSOR

[75] Inventors: Tsutomu Inaba; Toshiyuki Nakamura; Tadashi Kimura, all of Wakayama, Japan

[73] Assignee: Mitsubishi Denki Kabushiki Kaisha, Tokyo, Japan

[21] Appl. No.: 593,349

[22] Filed: Mar. 26, 1984

[30] Foreign Application Priority Data

Mar. 26, 1983 [JP] Japan ................................ 58-50834

[51] Int. Cl.⁴ ................... F04B 39/06; F04B 39/02; H02K 9/08
[52] U.S. Cl. .................... 417/366; 417/372; 417/902; 418/55; 310/57
[58] Field of Search ............. 417/366, 369, 372, 902, 417/410; 418/55, DIG. 1; 310/57, 87

[56] References Cited

U.S. PATENT DOCUMENTS

| | | | |
|---|---|---|---|
| 2,228,364 | 1/1941 | Philipp | 417/372 X |
| 2,283,025 | 5/1942 | Wolfert | 417/902 X |
| 2,678,156 | 5/1954 | Henderson | 418/DIG. 1 X |
| 4,091,638 | 5/1978 | Mitch | 417/902 X |
| 4,115,035 | 9/1978 | Tankred et al. | 417/902 X |

FOREIGN PATENT DOCUMENTS 1029178  5/1966  United Kingdom ................ 417/372

*Primary Examiner*—William L. Freeh
*Assistant Examiner*—Theodore Olds
*Attorney, Agent, or Firm*—Sughrue, Mion, Zinn, Macpeak, and Seas

[57] ABSTRACT

A scroll having flow passages constructed so as to provide improved lubricating properties while eliminating excessive consumption of oil. First flow paths have upper ends communicating with a motor chamber formed between the frame of the compressor and an upper portion of the electric motor which drives the compressor, and lower ends which open above an oil pool formed in the lower part of the housing of the compressor. The first flow paths extend in the axial direction of the compressor between the outer wall of the motor and the frame so that all or part of the gas which is sucked into the motor chamber can flow downwardly. Second axially extending flow paths are provided extending in the axial direction of the compressor between the frame and the shell with the gas passing through the first flow paths being caused to change its direction of flow near the lower end of the frame to flow upwardly. The lower ends of the second flow paths open above the oil pool and their upper ends communicate with the compression unit at the top of the housing.

13 Claims, 6 Drawing Figures

SCROLL COMPRESSOR

BACKGROUND OF THE INVENTION

The present invention relates to a scroll compressor which is employed as a coolant compressor, and more particularly to a scroll compressor having improvements in the pathways for gas sucked through the compressor.

Prior to describing the invention, the principles of a conventional scroll compressor will be described.

The fundamental components of a conventional scroll compressor are shown in FIGS. 1A through 1D. In these figures, reference numeral 1 designates a stationary scroll, 2 an orbiting scroll, 5 a compression chamber formed by the scrolls 1 and 2, and 0, the center of the stationary scroll.

The stationary scroll 1 and the orbiting scroll 2 are a pair of spiral-shaped wraps which have the same configuration but are wound in opposite directions. The spiral structures are involute or arcuate in section. The spiral structures are combined together to form the compression chamber 5 therebetween.

The operation of the scroll compressor will now be described. As shown in FIGS. 1A through 1D, the orbiting scroll 2 moves around the center 0 of the stationary scroll 1, that is, it orbits about the center 0 with its angular orientation relative to a stationary reference unchanged, that is, without rotational movement. Due to this movement of the orbiting scroll 2, the volume of the compression chamber 5 is periodically decreased, as a result of which gas taken into the compression chamber 5 is compressed and discharged.

An example of a conventional scroll compressor will be described with reference to FIG. 2. The scroll compressor shown in FIG. 2 is intended to be applied to a refrigerator, an air conditioner or an air compressor, for instance, where it is used to compress a refrigerant gas such as Freon ™. In FIG. 2, reference numeral 1 designates a stationary scroll, 2 an orbiting scroll, 3 the base plate of the orbiting scroll 2, with the base plate having a diametrical groove 3A on the back thereof, 4 an orbiting scroll shaft, 5 a compression chamber, 6 the suction inlet of the compression chamber 5, 7 a ring slightly spaced apart from the back of the orbiting scroll base plate 3, 8 a ring-shaped Oldham coupling for preventing rotation of the orbiting scroll 2 while permitting the latter to orbit, with the coupling 8 having protrusions 8a and 8b arranged crosswise, 9 a thrust bearing supporting the back of the orbiting scroll base plate 3, 10 a frame or a bearing support to which is fixed the stationary scroll 1 with screws and which is secured to a shell (described below) by press fitting, 11 an Oldham chamber formed between the base plate 3 and the ring 7 and the bearing support 10, 12 oil returning holes formed in the bearing support 10, through which the Oldham chamber is communicated with a motor chamber (described below), 13 an electric motor, 13a a motor stator, and 13b a motor rotor.

Further in FIG. 2, reference numeral 14 designates a crankshaft, 15 oil holes formed eccentrically in the crankshaft 14, 16 an orbiting bearing formed eccentrically on the crankshaft 14 and engaged with the orbiting scroll shaft 4, 17 a main bearing engaged with the upper portion of the crankshaft 14, 18 a motor bearing engaged with the middle portion of the crankshaft 14, 19 a motor chamber formed by the bearing suppport 10, the motor stator 13a and the motor rotor 13b, 20 a first balancer secured to the upper portion of the motor rotor 13b, 21 a second balancer secured to the lower portion of the motor rotor 13b, 22 a shell which fixes the bearing support 10 and seals the entire compressor, 23 an oil pool formed on the bottom of the shell 22, 24 a suction pipe through which the motor chamber 19 is communicated with the outside, 25 an air gap between the motor stator 13a and the motor rotor 13b, 26 flow paths formed between the outer wall of the bearing support 10 and the inner wall of the shell 22 having lower ends opening above the oil pool 23 in the shell 22 and upper ends communicating with the suction chamber 6, 27 a discharge pile for discharging gas from the central portion of the stationary scroll to the outside of the shell 22, and 28 throughholes in the motor rotor 13b.

The operation of the scroll compressor thus constructed will be described.

When current is applied to the motor stator 13a, the motor stator 13b generates torque to drive the crankshaft 14. When the crankshaft 14 starts rotating, its torque is transmitted to the orbiting scroll shaft 4 engaged with the orbiting bearing which is formed eccentrically on the crankshaft 14 so that the orbiting scroll 2 is orbited while being guided by the Oldham coupling 8, thus performing a compression action as depicted in FIG. 1. The flow of gas is as indicated by the solid line arrow. The gas which enters the motor chamber 19 through the suction pipe 24 cools the motor stator 13a and the motor rotor 13b while passing through the air gap 25 and the ventilating holes 28. Then, the direction of flow of the gas is changed above the oil pool 23. The gas is pulled into the suction chamber 6 after passing through the flow path 26 and is then introduced into the compression chamber 5. As the crankshaft 14 rotates, the gas is delivered towards the center of the compressor and is then discharged through the discharge pipe provided at the center of the stationary scroll 1.

Next, the lubricating system of the compressor will be described. The lubricant in the oil pool 23 is sucked upwardly through the lower end of the crankshaft 14 by the pumping action of the oil holes 15 formed eccentrically in the crankshaft 14 as indicated by the broken line arrows in FIG. 2. The lubricant is thus supplied through the oil holes 15 to the orbiting bearing 16, the main bearing 17, the motor bearing 18, and the thrust bearing 9, and is then delivered into the Oldhams chamber 11. The lubricant pooled in the Oldhams chamber 11 is dropped into the motor chamber 19 through the oil returning holes 12 and returned to the oil pool 23 through the air gap 25.

The orbital motion of the orbiting scroll 2 caused by the rotation of the crankshaft 14 tends to cause the whole compressor to vibrate. However, as balance around the crankshaft 14 is maintained by the first and second balancers 20 and 21, the compressor operates without abnormal vibration.

In the conventional scroll compressor thus constructed, the gas sucked into the motor chamber 19 through the suction pipe 24 flows above the oil pool after passing through the air gap 25 and the ventilating holes 28, striking the lubricant in the oil pool 23 and then reversing its direction of flow. Then, after passing through the flow paths 26, the gas is sucked into the suction chamber 6. The lubricant in the oil pool 23 is agitated by the rotation of crankshaft 14 at all times. Therefore, the surface of the lubricant is not still as shown in FIG. 2, that is, it tends to rotate in the oil pool and be splashed thereabout. As the air gap 25 and the ventilating holes 28 have a relatively small cross-sectional area, the gas increases in speed when passing therethrough, thus striking the lubricant in the oil pool 23. When striking the lubricant, the gas imparts its force to the lubricant so that the latter is splashed. The splashed droplets, carried by the sucked gas, pass through the flow paths 26, and are sucked into the suction chamber 6. When the compressor is stopped, coolant tends to be mixed into the oil in the oil pool 23. When the compressor is started, the abrupt pressure decrease causes foaming of the lubricant. If excessive lubricant is present, the amount of lubricant in the oil pool 23 will be gradually depleted because the lubricant is discharged out of the compressor through the discharge pipe 27. The amount of lubricant supplied through the oil holes 16 to the bearings may become insufficient, making it impossible to operate the compressor safely.

In general, a motor generates heat when operated. The conventional scroll compressor is so designed that the intake gas absorbs the heat thus generated when passing through the air gap 25 and the ventilating holes 28 and when flowing along the outer wall of the motor stator 13a and passing through the flow paths 26. Accordingly, the motor is sufficiently cooled. However, as the gas absorbs the heat generated by the motor, the temperature of the gas is high, as a result of which the gas has a small specific gravity, that is, the gas is thin at the point where it enters the suction chamber 6. When such thin gas is sucked into the compression chamber 5 from the suction chamber 6, the mass of intake gas per revolution of the crankshaft 14 is small, as a result of which the efficiency of the compressor is low. Furthermore, since the ventilating holes 28 of the motor rotor 13b and the air gap 25 are generally considerably small in cross-sectional area, a pressure loss is caused when the gas passes therethrough, which adversely affects the performance of the compressor.

Accordingly, an object of the invention is to eliminate the above-described difficulties accompanying a conventional scroll compressor.

SUMMARY OF THE INVENTION

In accordance with the above and other objects, the invention provides a scroll compressor in which intake-gas flow paths are provided between the outer wall of the motor and the frame so that all or part of the gas sucked into the motor chamber is caused to flow downwardly through the gas flow paths. The direction of flow is then changed to cause the gas to flow upwardly, to thereby separate the lubricant therefrom. Thereafter, the gas is sucked into the suction chamber after passing through flow paths formed between the frame and the shell. Accordingly, the amount of lubricant consumed is reduced and both the reliability and the performance of the compressor are high.

DESCRIPTION OF THE PREFERRED EMBODIMENTS

Figure 1A:
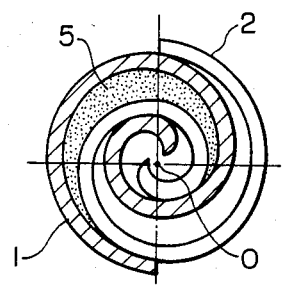
FIGS. 1A through 1D are explanatory diagrams used to describe the principles of a scroll compressor showing operating steps of the latter.
Figure 1B:
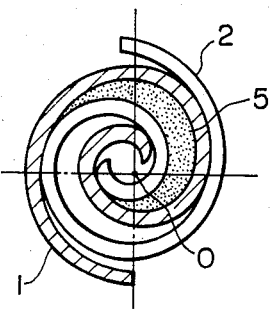
Figure 1D:
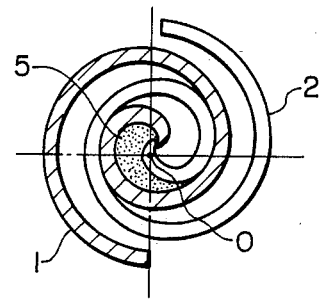
Figure 1C:
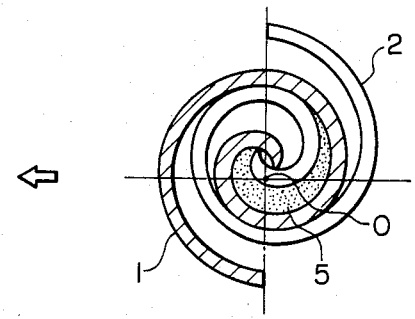
Figure 2:
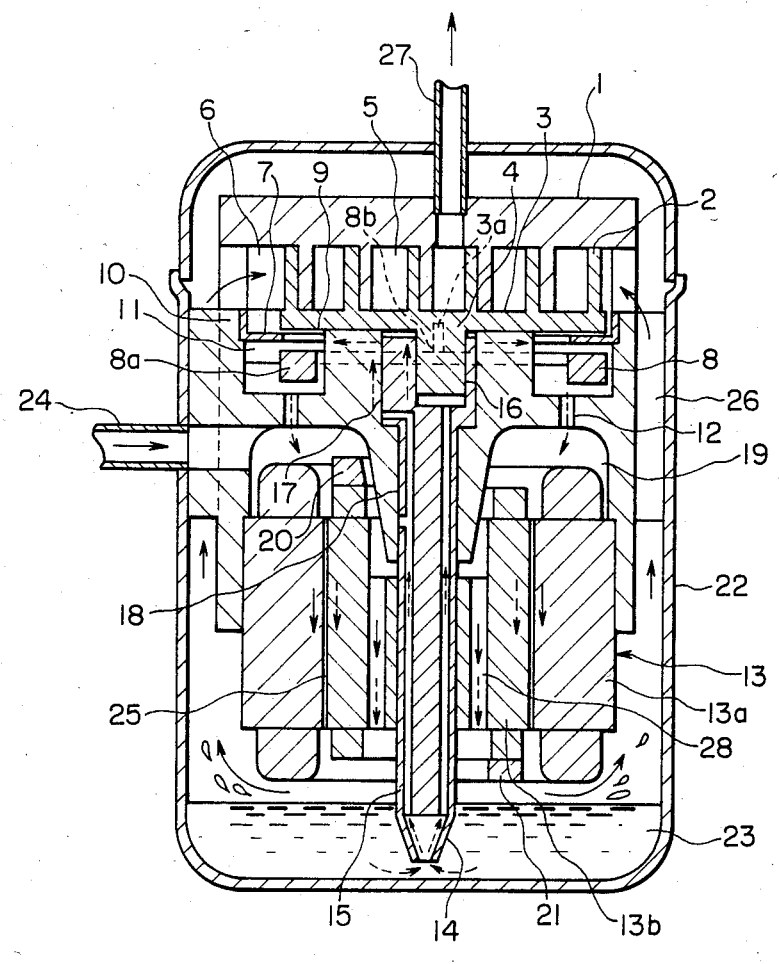
FIG. 2 is a sectional view showing a conventional scroll compressor.
Figure 3:
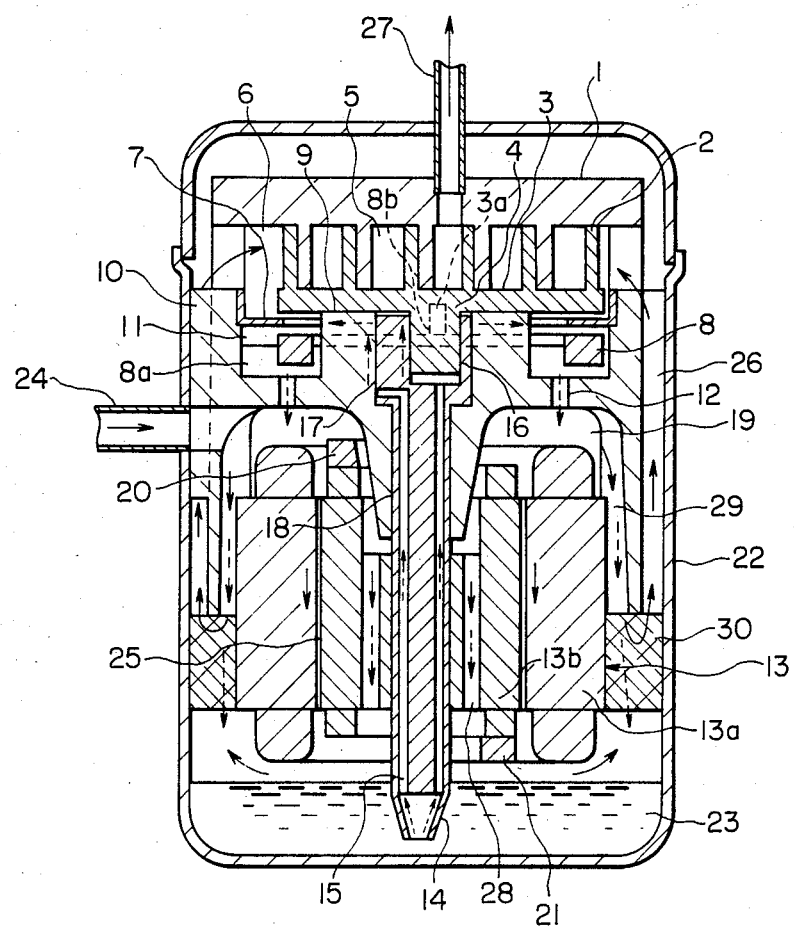
FIG. 3 is a sectional view showing a scroll compressor constructed in accordance with the invention.

A preferred embodiment of the invention will be described with reference to FIG. 3, in which those components which have been previously described with reference to FIG. 2 are designated by like reference numerals. In FIG. 3, reference numeral 29 designates flow paths which extend in the axial direction between the outer wall of the motor stator 13a and the frame or the bearing support 10, and which has upper ends communicating with the motor chamber 19 and lower ends opening above the oil pool 23 on the bottom of the shell 22. Reference numeral 30 designates an annularly shaped demister fitted between the motor stator 13a and the shell 22 near the lower end of the bearing support. The flow paths 29 are provided circumferentially at predetermined intervals. As in the conventional scroll compressor, the motor stator 13a is partially secured to the bearing support 10. The other components in FIG. 3 are the same as those in FIG. 2, and detailed descriptions thereof will be omitted.

In the scroll compressor thus constructed, the gas sucked into the motor chamber 19 flows as indicated by the solid line arrows in FIG. 3. That is, a small part of the gas, after passing through the air gap 25 and the ventilating holes 28, reverses its direction of flow and is sucked into the suction chamber 6 after passing through the demister 30 and the flow paths 26, while the remaining larger part of the gas flows downwardly along the flow paths 29, reverses its direction of flow in the demister 30, and is then sucked into the suction chamber 6 after passing through the flow paths 26.

Accordingly, the amount of intake gas which can strike the lubricant in the oil pool 23 is small, and the speed thereof is low. Therefore, very little lubricant will be splashed. Also, even if this gas takes up a part of the splashed lubricant, the lubricant is separated by the demister 30 while the gas passes through the latter. Lubricant dropped through the oil returning holes 12 or passing through the suction pipe 24 mixes with the gas which passes through the flow paths 29. However, since the intake gas, after flowing down the flow paths 29, strikes the demister 30 where it reverses its direction of flow, and then flows into the flow paths 26, the lubricant drops into the oil pool 23 while being separated by the force of gravity or by inertial force. Furthermore, in this operation and in the case where the coolant mixed in the lubricant in the oil pool 23 causes foaming when the compressor is started, excessive consumption of lubricant is prevented because the amount of gas passing the vicinity of the oil pool 23 is small and the lubricant is separated by the demister 30.

The amount of gas which is used to cool the motor 13 is smaller than that in the conventional scroll compressor. Therefore, the temperature of the motor may be somewhat higher; however, the flow rate of the gas can be made sufficiently great that the temperature of the motor is lower than the maximum allowable value. In other words, by suitably selecting the size of the flow paths 29, the amount of gas which cools the motor 13 while passing through the air gap 25 and the ventilating holes 28 can be minimized. The remaining sucked gas flows directly into the flow paths 26, while therefore the rise in temperature due to the heat generated by the motor 13 can be eliminated. Of the gas which flows in two directions as described above, the temperature of the part flowing through the motor 13 is increased.

Since the amount of heat which is radiated from the motor stator 13a through the frame or the bearing support 10 and the shell 2 to the outside is increased, the temperature of the gas sucked into the suction chamber 6 is low. Accordingly, the specific gravity of the sucked gas is increased, and the mass flow of the intake gas per revolution of the crankshaft 14 is increased. That is, the efficiency of the compressor is increased.

Furthermore, as the less gas passes through the air gap 25 and the ventilating holes 28 and the flow paths 29, the pressure loss there is reduced, which contributes to an improvement of the efficiency of the compressor.

As is apparent from the above description, in the scroll compressor according to the invention, both during normal quiescent operation and at the start of the compressor, the intake gas takes up very little lubricant in the oil pool, the rise of temperature of the gas introduced into the compression chamber is small, and the pressure loss is small when the gas passes through the motor. Thus, the scroll compressor provided according to the invention has high reliability and high performance.

We claim:

1. In a scroll compressor comprising a stationary scroll and an orbiting scroll forming a compression chamber therebetween; an Oldham coupling for maintaining said orbiting scroll at a constant angle with respect to said stationary scroll; a crankshaft for transmitting a drive force to said orbiting scroll; a frame supporting said crankshaft; a motor secured to said frame for driving said crankshaft; and a housing accommodating at least said stationary scroll, said orbiting scroll and said motor, wherein a compression unit including said stationary scroll and said orbiting scroll is arranged in an upper portion of said housing and said motor is arranged in a lower portion of said housing, the improvement comprising:

first and second flow paths, said first flow paths having upper ends communicating with a motor chamber formed at an upper portion of said motor, lower ends opening above an oil pool in said housing and portions downstream of said lower ends entering said second flow paths, said first flow paths extending in an axial direction of said compressor and passing through interior portions of said motor; and said second flow paths extending in the axial direction of said compressor and including a first, downward portion extending between said frame and an exterior surface of said motor, said downward section being substantially axially shorter than said motor, a second, upward portion extending between said frame and said housing and sharply bending direction changing portions between said first and second portions, said direction changing portions of said second flow paths constituting lower portions of said second flow paths and being located substantially above and isolated from said oil pool, said second flow paths joining said first flow paths near said sharply bending portions and having upper ends communicating with said compression unit.

2. The scroll compressor as claimed in claim 1, wherein the improvement further comprises a demister fitted between said frame and an outer wall of said motor near the lower end of said frame, at said downstream portions of said first flow paths.

3. The scroll compressor as claimed in claim 1, wherein said first flow paths are dimensioned to provide a sufficient gas flow rate to maintain the temperature of said motor below a predetermined value at which said motor overheats.

4. The scroll compressor as claimed in claim 2, wherein all of said gas which flows from said first downward portion to said second upward portion passes through said demister.

5. The scroll compressor as claimed in claim 2, wherein said demister is annularly shaped, and is positioned above said oil pool.

6. The scroll compressor as claimed in claim 5, wherein said demister faces and is spaced from the surface of the oil collected in said oil pool.

7. The scroll compressor as claimed in claim 1, wherein said frame further comprises a thrust bearing supporting said orbiting scroll and positioned at a center portion of said frame, and a chamber encircling said thrust bearing and being isolated from said second upward portion of said second flow paths.

8. The scroll compressor as claimed in claim 2, wherein said frame further comprises a thrust bearing supporting said orbiting scroll and positioned at a center portion of said frame, and a chamber encircling said thrust bearing and being isolated from said second upward portion of said second flow paths.

9. The scroll compressor as claimed in claim 4, wherein said demister is annularly shaped, and is positioned above said oil pool.

10. The scroll compressor as claimed in claim 7, further comprising oil returning holes formed in said frame at a bottom portion of said chamber, such that oil supplied to said thrust bearing is delivered into said chamber and then drops into said motor chamber through said oil returning holes.

11. The scroll compressor as claimed in claim 10, further comprising a ring spaced slightly apart from a back of said orbiting scroll and disposed between said chamber and a suction inlet of said compression chamber.

12. The scroll compressor as claimed in claim 10, further comprising an orbiting bearing formed eccentrically on said crankshaft and engaged with an upper portion of said crankshaft, a main bearing engaged with an orbiting scroll shaft of said orbiting scroll, and an oil hole formed eccentrically in said crankshaft; oil in said oil pool being delivered upwardly through a lower end of said crankshaft by a pumping action of said oil hole during operation, and being then supplied to said thrust bearing through said orbiting bearing and said main bearing.

13. The scroll compressor as claimed in claim 3, wherein said first flow paths comprise at least two parallel paths, one of which passes through a rotor of said motor and the other of which extends between said rotor and a stator of said motor.

* * * * *